United States Patent [19]

Vetter

[11] Patent Number: 4,606,130

[45] Date of Patent: Aug. 19, 1986

[54] APPARATUS FOR MONITORING THE DIAMETERS AND AXIAL POSITIONS OF WORKPIECES IN MACHINE TOOLS

[75] Inventor: Ulrich Vetter, Stuttgart, Fed. Rep. of Germany

[73] Assignee: Schaudt Maschinenbau GmbH, Stuttgart, Fed. Rep. of Germany

[21] Appl. No.: 690,128

[22] Filed: Jan. 10, 1985

[30] Foreign Application Priority Data

Jan. 13, 1984 [DE] Fed. Rep. of Germany ....... 3401081

[51] Int. Cl.[4] .......................... G01B 7/02; G01B 7/12
[52] U.S. Cl. .................................. 33/178 E; 33/548; 33/557
[58] Field of Search ............ 33/143 L, 147 N, 178 E, 33/505, 548, 557, 560

[56] References Cited

U.S. PATENT DOCUMENTS

| 2,352,507 | 6/1944 | Aller et al. | 33/548 |
| 2,370,220 | 2/1945 | Aller et al. | 33/557 |
| 2,835,042 | 5/1958 | Tandler et al. | 33/505 |
| 4,437,239 | 3/1984 | Possati | 33/143 L |

FOREIGN PATENT DOCUMENTS

| 59942 | 1/1968 | Fed. Rep. of Germany .... 33/178 E |
| 1245141 | 9/1971 | United Kingdom ............ 33/147 N |

Primary Examiner—Richard R. Stearns
Attorney, Agent, or Firm—Peter K. Kontler

[57] ABSTRACT

A plain grinding machine wherein the gauges which are used to monitor the diameter and the axial position of a workpiece constitute a unitary apparatus with one or two first sensors which can be moved linearly at right angles to the axis of the workpiece which is mounted in the machine tool and a second sensor which is pivotable about an axis extending at right angles to the axis of the workpiece in response to engagement with a shoulder on the workpiece. The second sensor can constitute one of the first sensors and the sensors can cause the generation of appropriate signals, denoting the diameter and the axial position of the workpiece, by a single signal generating measuring unit or by two discrete units.

17 Claims, 7 Drawing Figures

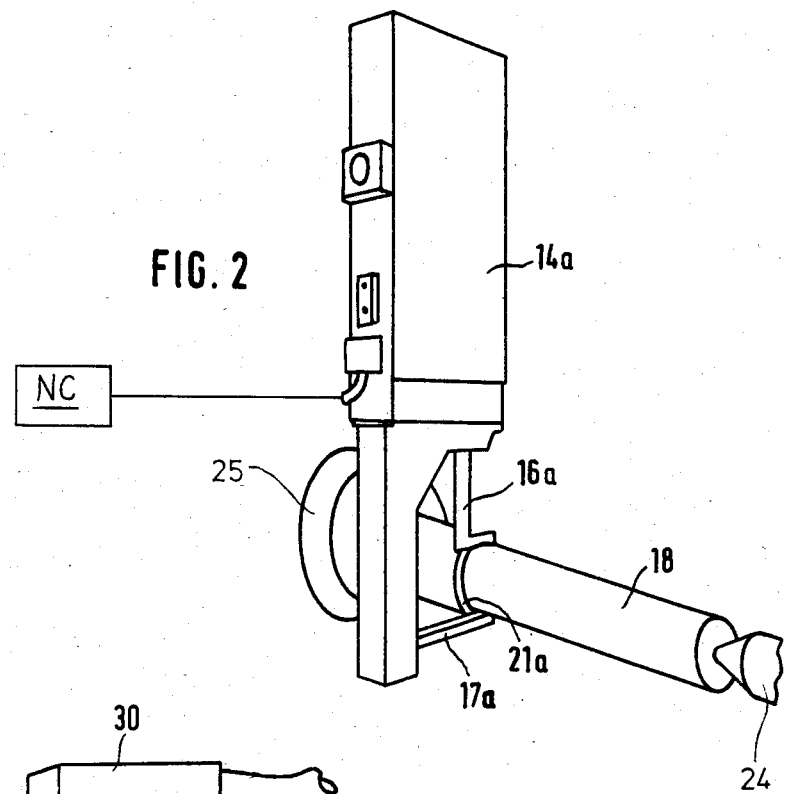
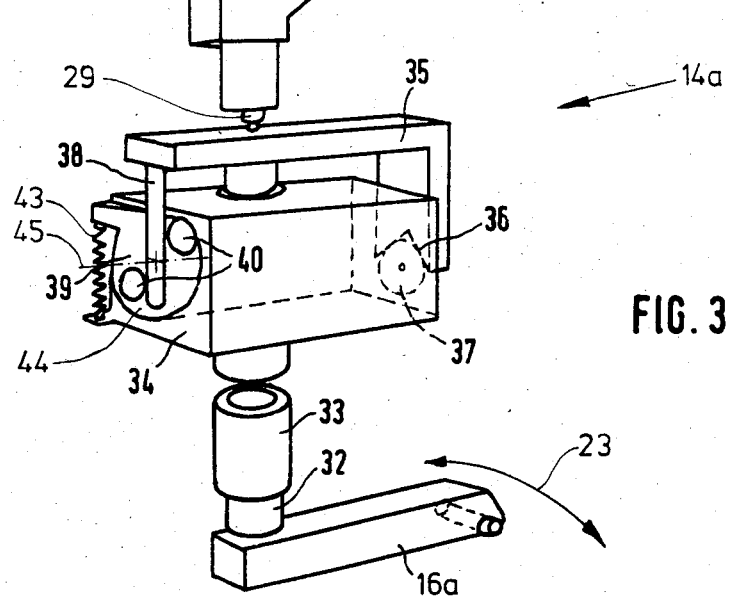

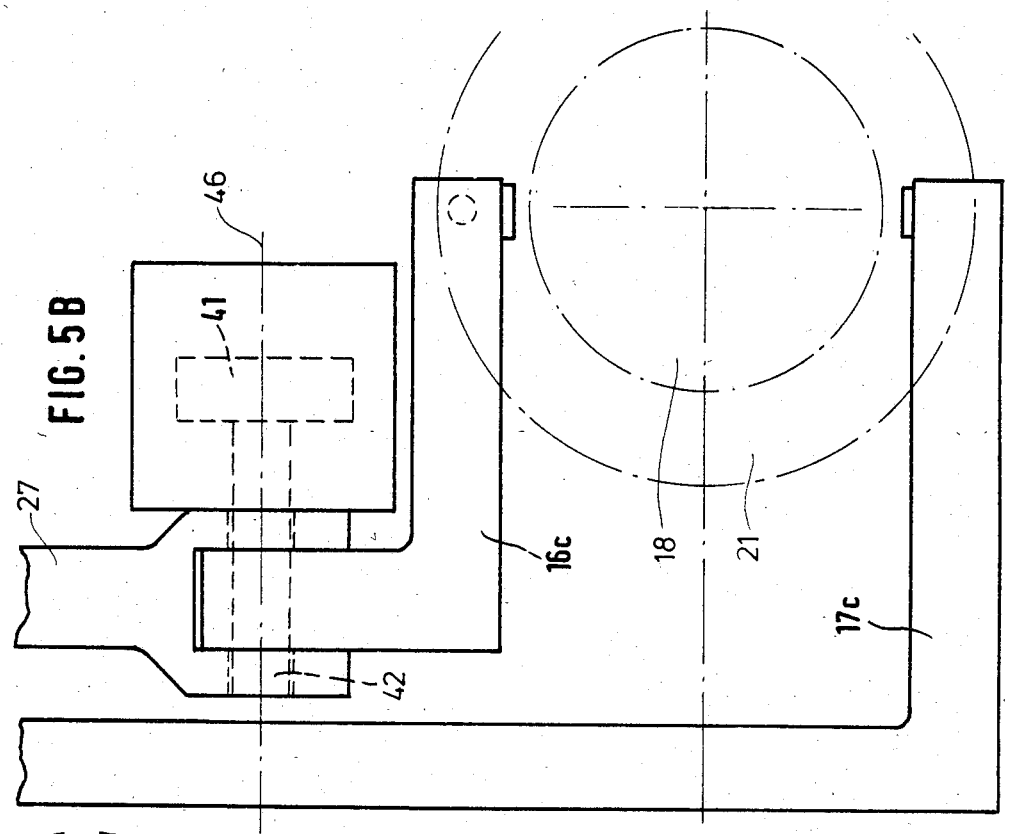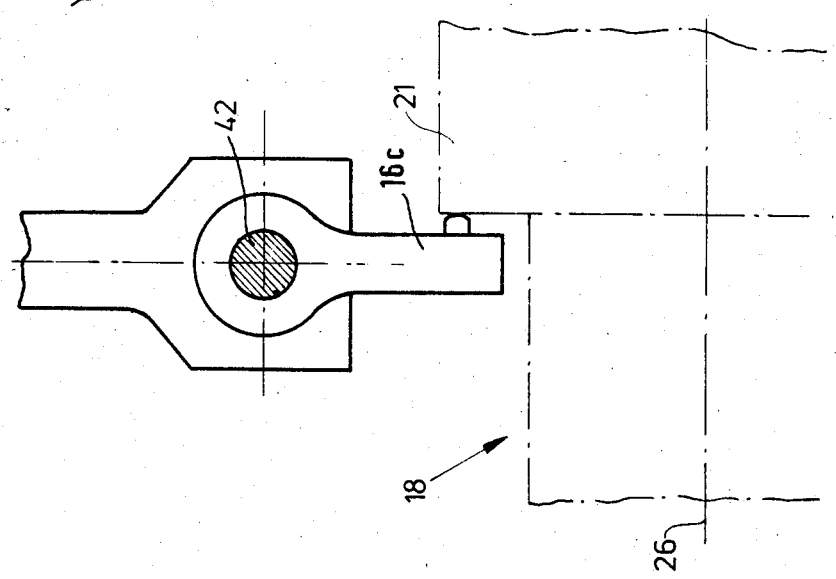

APPARATUS FOR MONITORING THE DIAMETERS AND AXIAL POSITIONS OF WORKPIECES IN MACHINE TOOLS

BACKGROUND OF THE INVENTION

The present invention relates to machine tools and other types of machines in general, and more particularly to improvements in apparatus for monitoring various parameters of workpieces in machine tools, especially in plain grinding machines. Still more particularly, the invention relates to improvements in apparatus of the type wherein the diameter of a workpiece which is held in a predetermined position is monitored by a system employing two sensors at least one of which is movable with reference to the other sensor so that the two sensors can engage a round or partially round workpiece at two points which are disposed diametrically opposite each other with reference to the axis of the workpiece.

It is customary to equip numerous types of machine tools, for example, plain grinding machines, with gauges which are used to monitor the diameter as well as the axial position of a workpiece. Such gauges are practically indispensable in machine tools which must treat workpieces with a high or very high degree of precision. The diameter gauge monitors the diameter of a workpiece before, during and/or subsequent to completion of material removal, and the gauge which ascertains the axial position of a workpiece is or can be put to use prior to start of material removal so as to ensure that the workpiece will be held in an optimum axial position with reference to the material removing tool or tools, e.g., with reference to one or more rotary grinding wheels in a plain or other grinding machine. Certain gauges which are used to ascertain the axial position of a workpiece in a plain grinding machine are called length measuring gauges; however, such definition is actually a misnomer because the gauge does not ascertain the length but rather the axial position of the monitored workpiece. In order to facilitate accurate selection of the axial position of a round workpiece, e.g., an elongated cylindrical shaft, such a workpiece is often provided with an annular shoulder adapted to be engaged by a component of the gauge which monitors the axial position of the workpieces; electric signals or other indications which are furnished by such gauge are used to correct, if necessary, the axial position of the monitored workpiece. For example, when the gauge which monitors the axial position of a workpiece in a plain grinding machine is in engagement with the aforementioned shoulder, the carriage which can move the workpiece in the axial direction is shifted until the indication which is furnished by the gauge denotes that the actual axial position of the workpiece matches the desired or optimum axial position or that the difference between the actual and desired axial positions is negligible or within the range of acceptable deviations from an optimum axial position. It is also possible to use the signals which are furnished by the just discussed gauge for monitoring the axial position of a workpiece as a means for changing the position of the material removing tool with reference to the workpiece until the tool and the workpiece assume optimum positions relative to each other. For example, signals which are generated by a diameter monitoring gauge or by a gauge which monitors the axial position of a workpiece can be transmitted to the numerical controls of a plain grinding machine. Still further, signals which the gauges transmit to the controls of a machine tool can be used to compensate for deviations from an optimum diameter or from an optimum axial position in a different way.

A drawback of presently known apparatus which employ the just discussed gauges is that they are complex, bulky and expensive. Thus, if such gauges are used to transmit signals to the automatic controls of a machine tool, it is necessary to provide an operative connection between the controls and each of the gauges and it is further necessary to provide a drive for at least one sensor of each of these gauges. All this contributes to the cost as well as to space requirements of conventional apparatus so that the workpiece is not readily accessible since the gauges cannot be placed at a substantial distance from the material removing station unless the machine is further equipped with means for moving the gauges toward and away from engagement with the workpiece.

OBJECTS AND SUMMARY OF THE INVENTION

An object of the invention is to provide a novel and improved apparatus which can be used in machine tools or the like to monitor various parameters of workpieces, especially the diameter and the axial position of a round workpiece in a plain grinding machine or the like, and which is not only simpler but also more accurate and more compact than heretofore known apparatus.

Another object of the invention is to provide an apparatus which can be installed in many existing machines as a superior substitute for heretofore known apparatus.

A further object is to provide a machine, especially a plain grinding machine or another machine tool, which embodies the above outlined apparatus.

An additional object of the invention is to provide an apparatus which is constructed, assembled and mounted in a machine in such a way that it affords more convenient access to the workpiece or workpieces.

Still another object of the invention is to provide an apparatus wherein the number of parts is a fraction of the number of parts in heretofore known apparatus which employ gauges for the monitoring of the diameter as well as of the axial position of a workpiece.

An additional object of the invention is to provide a novel and improved diameter monitoring gauge for use in the above outlined apparatus.

A further object of the invention is to provide a novel and improved gauge which can be used to monitor the axial position of a workpiece in a machine tool or the like.

Another object of the invention is to provide an apparatus which embodies the just outlined gauges.

The invention is embodied in an apparatus which serves to ascertain the diameters and axial positions of round workpieces which are treated in a machine wherein the axis of the workpiece which is being treated coincides with a predetermined axis (such predetermined axis can be defined by two centers for the end portions of the workpiece). The apparatus comprises a diameter measuring assembly including at least one first sensor which is movable (e.g., reciprocable by the numerical controls of a plain grinding machine) at right angles to the predetermined axis and into engagement with the periphery of a round portion of the workpiece so that the position of the first sensor with reference to the predetermined axis is indicative of the diameter of the workpiece, at least one second sensor movable by a workpiece which is being treated or is about to be treated with reference to a given axis (e.g., the axis of a shaft which is rigidly connected with the second sensor) which is normal to the predetermined axis so that the angular position of the second sensor with reference to the given axis is indicative of the axial position of the workpiece, and measuring means (including one or two measuring units) for monitoring the positions of the first and second sensors with reference to the predetermined axis and the given axis, respectively. The monitoring means can generate electric or other suitable signals which can be transmitted to the controls of the machine or which can be displayed for observation by an attendant.

The diameter measuring assembly can comprise two first sensors including the one first sensor and the second sensor. The second sensor is then disposed substantially diametrically opposite the one first sensor with reference to the predetermined axis when the two sensors engage the periphery of a workpiece, and the second sensor is then preferably also movable at right angles to the predetermined axis, the same as the one first sensor, so that the position of the second sensor during or as a result of such movement is also indicative of the diameter of the workpiece which is held between two centers or the like. As mentioned above, the measuring means can comprise a single measuring unit for both sensors, e.g., a single measuring unit which can generate signals in response to movements of the second sensor at right angles to the predetermined axis as well as in response to angular movements of the second sensor about the given axis.

If the diameter measuring assembly includes two first sensors one of which performs the function of the second sensor, the two first sensors are disposed diametrically opposite each other with reference to the predetermined axis when the assembly is in use, and at least one of these first sensors is reciprocable into and from engagement with the workpiece at right angles to the predetermined axis so that its position is indicative of the diameter of the monitored workpiece. The given axis is normal to the direction of reciprocatory movement of the reciprocable sensor and the measuring means then preferably includes a unit which serves to monitor the extent of angular movement of the second sensor about the given axis. In accordance with one presently preferred embodiment of the invention, such apparatus further comprises a holder which is stationary with reference to the measuring means, a shaft which defines the given axis, which is rotatable and axially movable with reference to the holder and which carries the second sensor, a preferably yoke-like motion transmitting member on the shaft, and moving means (such as a projection) provided on the holder and cooperating with the yoke-like member (e.g., with two cam faces on the yoke-like member) to move the shaft and the yoke-like member axially of the shaft in response to angular displacement of the second sensor about the given axis. The measuring means is then responsive to the axial movement of the yoke-like member and shaft to generate signals when the second sensor is moved in the direction of the axis of the shaft at right angles to the predetermined axis to ascertain the diameter of a workpiece as well as when the second sensor is moved angularly and such angular movement entails an axial movement of the shaft and the yoke-like member. Such apparatus preferably further comprises displacing means (e.g., a rod) which is interposed between the yoke-like member and the measuring means; however, it is equally possible to have the yoke-like member or the shaft act directly upon a motion receiving element of the measuring means. The yoke-like member can comprise a first portion (e.g., in the form of a first arm) which cooperates with the moving means on the holder, and such apparatus preferably further comprises centering means for yieldably urging the second sensor to a predetermined angular position by way of a second portion (e.g., a second arm) of the yoke-like member. The centering means can include a rotary element (e.g., a disc) which is mounted on the holder and has two protuberances flanking the second portion of the yoke-like member, and a coil spring or other suitable means for biasing the protuberances against the second portion of the yoke-like member.

In accordance with a further embodiment of the invention, the apparatus can comprise two first sensors forming part of the diameter measuring assembly and the measuring means then includes a first unit serving to generate signals in response to movement of the first sensors at right angles to the predetermined axis and a second unit which serves to generate signals in response to angular movement of the second sensor about the given axis. The second sensor and the second unit can be mounted on (and thus share all movements of) one of the first sensors.

It will be noted that the measuring means can comprise a single measuring unit which responds to reciprocatory movements of one or two first sensors as well as to angular movement of the second sensor. Alternatively, the measuring means can comprise a first unit which responds to reciprocatory movements of the first sensor or sensors and a second unit which responds to angular movements of the second sensor. A carriage is preferably provided to move the sensors and the measuring means in substantial parallelism with the predetermined axis. The measuring means can but need not always be disposed at a level above the predetermined axis. The second sensor can include a first section which is operatively connected with the measuring means and a second section which is pivotable with reference to the first section about the aforementioned given axis. The work contacting portion of the first sensor can be nearer to the measuring means than the work contacting portion of the second sensor or vice versa.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 2 is a somewhat schematic perspective view of an apparatus which embodies one form of the present invention and wherein the upper sensor of the diameter measuring gauge constitutes the sensor which monitors the axial position of the workpiece;

FIG. 3 is an enlarged fragmentary exploded perspective view of certain details in the apparatus of FIG. 2;

FIG. 5A is a fragmentary end elevational view of a sensor which constitutes a modification of the upper sensor in the apparatus shown in FIGS. 2 and 3 and forms part of a third apparatus wherein the measuring unit which forms part of the diameter monitoring gauge does not participate in determination of the axial position of the workpiece;

FIG. 5B is a view as seen from the left-hand side of FIG. 5A and further shows the other sensor of the diameter measuring gauge.

DESCRIPTION OF THE PREFERRED EMBODIMENTS

Figure 1:
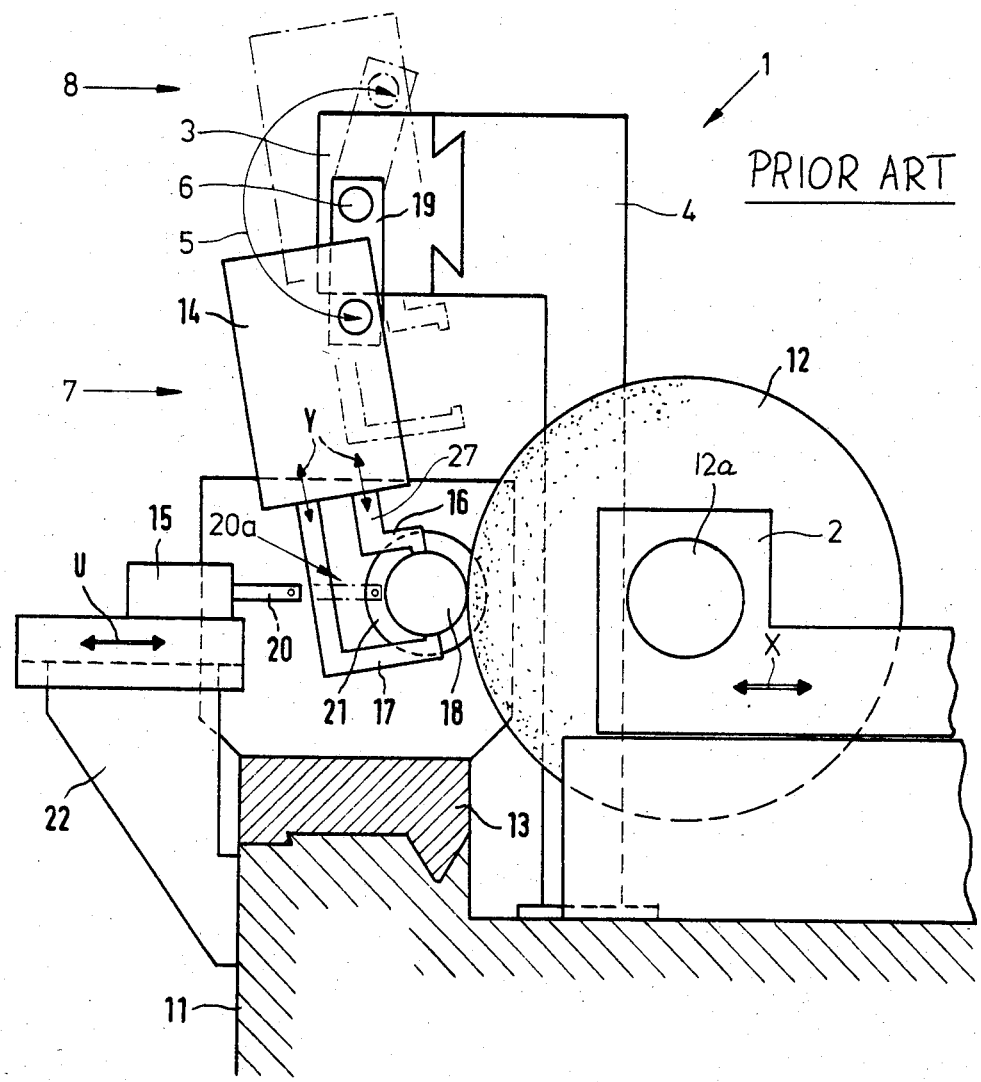
FIG. 1 is a fragmentary schematic partly transverse vertical sectional view of a plain grinding machine of conventional design with discrete gauges for monitoring the diameter and the axial position of a workpiece.

Referring first to FIG. 1, there is shown a portion of a conventional plain grinding machine 1 which includes a base or bed 11 supporting a tool slide or carriage 2 which is reciprocable in directions indicated by a double-headed arrow X. The slide 2 supports the spindle 12a for a grinding wheel 12. The bed 11 further supports a second slide or carriage 13 which supports the workpiece 18 and is reciprocable at right angles to the plane of FIG. 1. The diameter of the workpiece 18 can be determined by a diameter measuring or monitoring gauge 14. The machine further comprises a second measuring or monitoring gauge 15 which is normally called a length measuring head but is actually an instrument which ascertains and indicates the axial position of the workpiece 18, and more particularly the axial position of an annular shoulder 21 on the workpiece. The end faces of the workpiece 18 are assumed to be held between the centers of a headstock and a tailstock in a manner which is known and, therefore, is not specifically shown in FIG. 1. The diameter measuring gauge 14 is mounted on a cross slide 3 which is reciprocable with reference to an upright column 4 in parallelism with the slide 13, i.e., at right angles to the plane of FIG. 1. The slide 3 carries a horizontal shaft 6 which is parallel to the paths of reciprocatory movement of the slides 3 and 13 and defines a pivot axis for a linkage 19 serving to pivot the diameter measuring device 14 between the solid line (operative) position 7 and the phantom-line (inoperative) position 8 of FIG. 1. The directions of pivotal movement of the linkage 19 about the axis of the shaft 6 are indicated by a double-headed arrow 5. The manner in which the linkage 19 receives motion from a suitable drive is not shown in FIG. 1.

The diameter measuring gauge 14 comprises two (first) sensors 16 and 17 which are disposed diametrically opposite each other with reference to an axis which coincides with the axis of the properly mounted workpiece 18 and which are movable into and from engagement with two spaced-apart portions of the peripheral surface of the workpiece by the numerical controls (not shown) of the grinding machine in directions indicated by the double-headed arrows Y and in accordance with a predetermined program. The mutual positions of the work-engaging tips of the sensors 16 and 17 are selected in dependency on the desired diameters of the workpiece 18, i.e., as a function of those diameters which are to be measured and indicated by the gauge 14.

The second gauge 15 is reciprocable on a bracket 22 which is fixedly secured to the base 11. The directions in which the lower portion of the gauge 15 is reciprocable with reference to the bracket 22 (i.e., with reference to the base 11) are indicated by a double-headed arrow U. FIG. 1 shows the retracted or inoperative position of the (second) sensor 20 for the gauge 15 by solid lines. An operative position (20a) of the sensor 20, in which the latter maintains its tip in the region of a median diameter of the shoulder 21 on the workpiece 18, is indicated by phantom lines. The sensor 20 is moved to the phantom-line position of FIG. 1 prior to selection of the final axial position of the workpiece 18 so that its tip is in alignment with the median portion or diameter of the shoulder 21. It will be readily seen that the bracket 22 and the parts 15, 20 thereon interfere with access to the workpiece 18 from the left-hand side of the grinding machine, as viewed in FIG. 1. Moreover, the grinding machine 1 of FIG. 1 must further comprise a programmable operative connection between the numerical controls and the gauge 15 (in order to move the gauge 15 and its sensor 20 in the directions which are indicated by the arrow U), and such operative connection also contributes to clogging of the area around the material removing station. This can present serious problems in connection with the treatment of certain types of workpieces and complicates the insertion of fresh workpieces into and the removal of finished workpieces from the machine.

The character 27 denotes the upper section of the sensor 16; such section transmits motion to parts in the housing of the gauge 14 so that such parts can indicate the selected diameter or the actual diameter of the workpiece 18.

In accordance with a feature of the invention, the gauges 14 and 15 are replaced with a single apparatus which can be used to carry out measurements denoting the diameter or diameters of a workpiece as well as the axial position of such workpiece. Otherwise stated, the gauge 14 or 15 is modified in such a way that it can perform the function or functions of the other (omitted) gauge. In the embodiment of the invention which is shown in FIGS. 2 and 3, the gauge 14 of FIG. 1 is replaced with a measuring device or gauge 14a which employs two (first) sensors 16a and 17a for measurement of the diameter of the workpiece 18 and wherein the sensor 16a enables the measuring unit or head 30 in the housing of the gauge 14a to furnish indications denoting the axial position of the workpiece 18. In other words, the structure which is shown in FIGS. 2 and 3 comprises a single gauge which employs only two sensors 16a, 17a to measure or monitor the diameter or diameters of a workpiece 18 which is properly mounted in the grinding machine and which further uses at least one of the sensors 16a, 17a (in the embodiment of FIGS. 2 and 3 the gauge 14a uses the sensor 16a) to ascertain and to indicate the axial position of the workpiece, namely whether or not the shoulder 21a of the workpiece 18 between a first center 24 and a second center (not specifically shown) on a tailstock 25 for the workpiece 18 is located at the desired or optimum distance from the locus where the grinding wheel (not shown in FIGS. 2 and 3) removes material from the workpiece as the latter is being driven by a motor in or on the tailstock 25.

The gauge 14a further comprises the aforementioned measuring unit or head 30 which is designed to generate and transmit signals denoting the diameter of the workpiece 18 (actually the distance between the work contacting portions of the sensors 16a and 17a) as well as signals which are indicative of the axial position of the workpiece 18 and its shoulder 21a. As can be seen in FIG. 3, the upper sensor 16a (which replaces the sensors 16 and 20 of FIG. 1) is movable (pivotable) about the axis of a shaft 32 which extends through a sleeve 33 at the underside of a block-shaped holder 34. The shaft 32 (and hence also the sensor 16a thereon) is further movable in the axial direction, i.e., up and down as viewed in FIG. 3, so that the upper end portion of the shaft 32 can cause a corresponding displacement of the motion receiving element 29 of the measuring unit 30 of the gauge 14a. The holder 34 is stationary with reference to the housing of the unit 30 and the upper end portion of the shaft 32 is connected with and shares all movements of a motion transmitting member 35 here shown as a yoke whose upper side is or can be moved into direct contact with the motion receiving element 29 of the unit 30. The function of the block-shaped holder 34 is somewhat analogous to that of the spindle sleeve or tail spindle in conventional diameter measuring gauges. The spindle sleeve normally receives a reciprocable measuring rod which can act upon the measuring unit in response to displacement of the corresponding sensor.

The upper side of the yoke 35 is shown in direct contact with the motion receiving element 29 of the measuring unit 30. However, it is equally within the purview of the invention to have the shaft 32 extend upwardly beyond the yoke 35 and into engagement with the element 29 or to provide on the central portion of the yoke 35 an upwardly extending rod which comes into actual engagement with and imparts motion to the element 29.

The right-hand portion or arm 36 of the yoke 35 (as viewed in FIG. 3) constitutes a follower having two mutually inclined cam faces flanking a substantially wedge-like space for the cylindrical projection 37 on the adjacent end face of the holder 34. The axis of the projection 37 is normal to the axis of the shaft 32. The other portion or arm 38 of the yoke 35 is located diametrically opposite the arm or follower 36 (with reference to the (given) axis of the shaft 32) and constitutes a rod which is disposed between and is normally engaged by each of two circular protuberances 40 of a centering disc 44 forming part of a centering device 39 for the yoke 35 and shaft 32. The disc 44 is rotatably mounted on the respective end face of the holder 34 and is biased in a counterclockwise direction, as viewed in FIG. 3, by a coil spring 43 which is attached to the holder 34 and serves to urge the protuberances 40 into engagement with the adjacent portions of the peripheral surface of the arm 38 when the yoke 35 is properly centered, namely when the yoke 35 is held in the lowermost position as viewed in FIG. 3 so that the projection 37 of the holder 34 is in contact with each of the two mutually inclined cam faces on the arm or follower 36. The phantom line 45 denotes in FIG. 3 the axis of the means for rotatably mounting the disc 44 of the centering device 39 on the respective end face of the holder 34. The spring 43 ensures that the yoke 35 is automatically centered as soon as the sensor 16a assumes a predetermined (neutral) angular position in which the projection 37 contacts both mutually inclined cam faces of the arm 36. The directions in which the sensor 16a is pivotable from such neutral angular position are indicated by the double-headed arrow 23.

When the gauge 14a of FIGS. 2 and 3 is used to furnish indications denoting the diameter of the workpiece 18, the sensor 16a is held in the neutral angular position by the spring 43 and cooperates with the sensor 17a in a manner as shown in FIG. 2, i.e., the two sensors engage the adjacent portions of the peripheral surface of the workpiece 18 at two points located diametrically opposite each other with reference to the (predetermined) axis which is defined by the center 24 and the non-illustrated center of the tailstock 25. The sensor 16a can but need not be moved axially in response to movement into engagement with the peripheral surface of the workpiece 18 between the two centers, i.e., the shaft 32 may but need not be shifted axially when the sensor 16a engages the workpiece, and the axial position of the element 29 is indicative of the measured diameter of the workpiece in the region between the work-contacting portions of the sensors 16a and 17a. The function of the sensor 17a is the same as that of the sensor 17 in the conventional diameter measuring gauge 14 of FIG. 1. It will be readily appreciated that the sensor 17 or 17a need not necessarily be mounted for movement radially of the workpiece 18 and with reference to the housing of the respective gauge 14 or 14a, i.e., the diameter can be ascertained exclusively by the sensor 16 or 16a so that the sensor 17 or 17a then merely constitutes a compensating device.

Before the grinding wheel (not shown in FIGS. 2 and 3) is caused to remove material from the workpiece 18 between the center 24 and the center of the tailstock 25, it is important and desirable to ascertain whether or not the workpiece is maintained in an optimum axial position with reference to the grinding wheel and/or other parts of the machine which embodies the apparatus of FIGS. 2 and 3. This is achieved by moving the sensor 16a against the shoulder 21a of the workpiece 18. If the gauge 14a is mounted on a carriage or slide (3) in the same way as the gauge 14 of FIG. 1, the slide for such gauge can be moved in the axial direction of the grinding wheel until the sensor 16a contacts the shoulder 21a. The unit 30 then automatically indicates whether or not the actual axial position of the workpiece 18 coincides with the desired or optimum axial position. If not, the shoulder 21a maintains the sensor 16a away from its neutral angular position, i.e., the shaft 32 is turned away from its centered position (in one of the directions which are indicated by the arrow 23) whereby the yoke 35 shares the angular movement of the shaft 32 relative to the sleeve 33 and holder 34, and the follower or arm 36 causes the entire yoke 35 to rise due to the fact that one of the mutually inclined cam faces on the arm 36 then slides with reference to the projection 37 of the fixedly mounted holder 34. The projection 37 can constitute a rotary element in order to facilitate the axial movements of the shaft 32 when the sensor 16a is compelled to leave its neutral angular position. The arm 38 then turns the disc 44 through the medium of one of the protuberances 40, and the disc 44 stresses the coil spring 43 so that the latter stores energy which is dissipated when the centering device 39 is allowed to return the shaft 32, the yoke 35 and the sensor 16a to their neutral or centered positions.

The lifted yoke 35 displaces the motion receiving element 29 whereby the measuring unit 30 (i.e., the measuring unit which is used to furnish indications denoting the diameter of the workpiece 18) indicates the angular position of the sensor 16a and hence the axial position of the workpiece. If the axial position of the workpiece 18 is unsatisfactory, signals which are generated by the measuring unit 30 cause the numerical controls of the machine to shift the carriage or slide (see the carriage or slide 13 of FIG. 1) with reference to the base of the grinding machine until the workpiece assumes its optimum or prescribed axial position.

It will be seen that the shaft 32 can move axially for the purpose of ascertaining the diameter of the workpiece 18, and that the shaft 32 can also move axially for the purpose of ascertaining the axial position of the workpiece. Since the two mutually inclined cam faces of the arm 36 on the yoke 35 are mirror symmetrical to each other with reference to a plane which includes the axis of the projection 36 in the neutral position of the yoke 35, it is immaterial whether the shoulder 21a causes or allows the sensor 16a to pivot from its neutral position in a clockwise or in a counterclockwise direction. The extent of axial displacement is the same regardless of whether the sensor 16a is turned clockwise or counterclockwise, as long as the extent of angular displacement from neutral position is the same. However, it is equally within the purview of the invention to provide the arm 36 of the yoke 35 with one or more differently configurated and/or inclined cam faces. For example, the configuration of cam faces at the lower end of the arm 36 of the yoke 35 can be such that the shaft 32 rises at a first rate in response to clockwise pivoting of the sensor 16a from its neutral position and that the shaft 32 rises at a different second rate when the sensor 16a is caused to leave its neutral position by pivoting in a counterclockwise direction. It is also possible to configurate the arm 36 in such a way that the shaft 32 lifts the yoke 35 when the sensor 16a is pivoted in one direction and that the shaft 32 causes the yoke 35 to descend (by gravity or under the action of resilient means, e.g., a spring which biases the motion receiving element 29 downwardly, as viewed in FIG. 3) when the sensor 16a is pivoted in the opposite direction.

The centering device 39 automatically returns the yoke 35 and the shaft 32 to their centered positions (i.e., the sensor 16a reassumes its neutral angular position) as soon as the workpiece 18 reaches its prescribed or optimum axial position.

Figure 4:
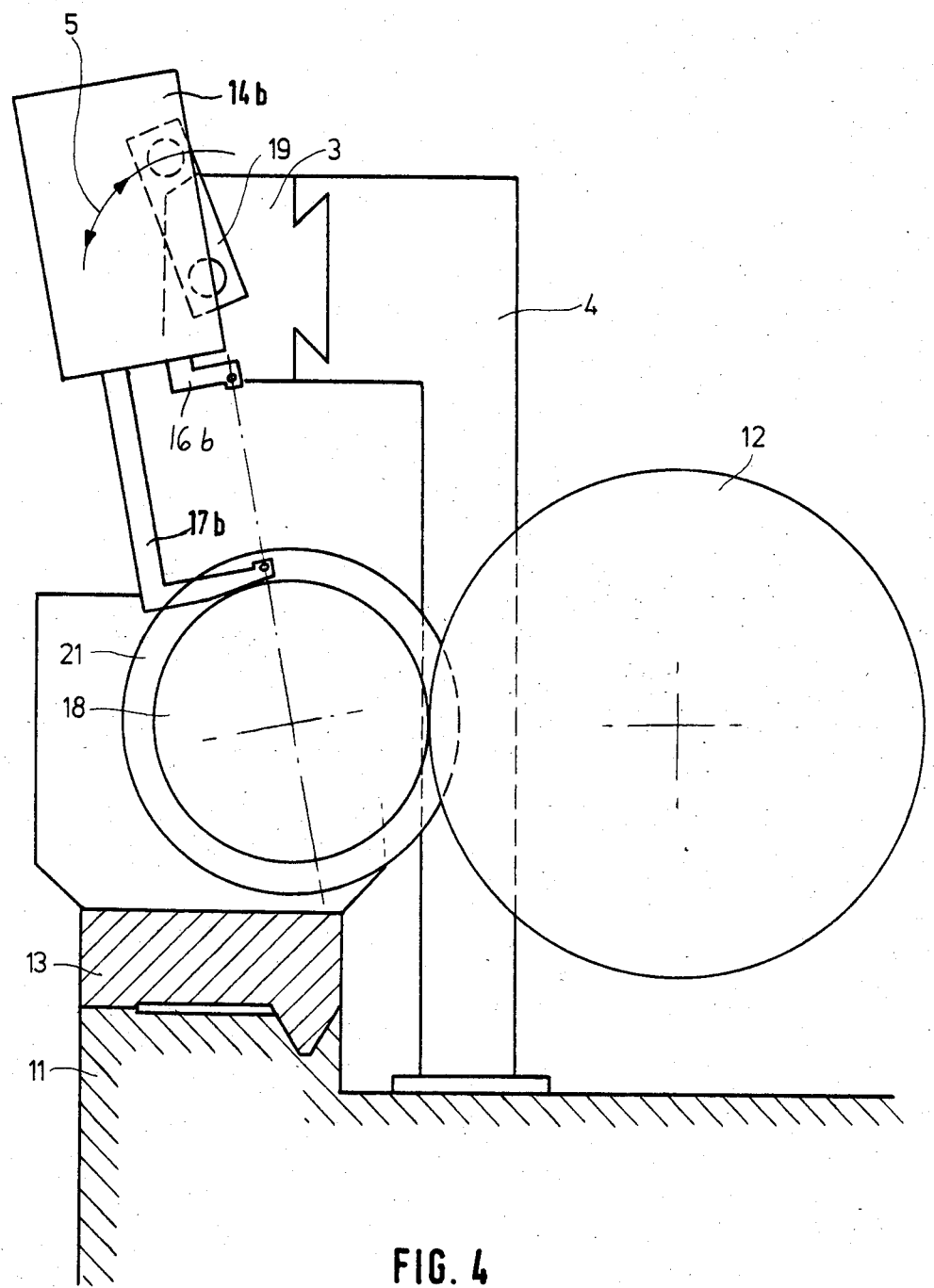
FIG. 4 is a fragmentary schematic partly vertical sectional view of a plain grinding machine with an apparatus which constitutes a modification of the apparatus shown in FIGS. 2 and 3 and wherein the lower sensor of the diameter monitoring gauge forms part of the means for monitoring the axial position of the workpiece.

FIG. 4 shows a portion of a grinding machine which embodies another feature of the present invention, namely the sensor 17b cooperates with the sensor 16b to enable the gauge 14b to monitor the diameter of the workpiece 18 and the sensor 17b cooperates with the measuring unit of the gauge 14b to ascertain the axial position of the workpiece. The shaft (not shown) which is rigidly connected with the upper end portion of the sensor 17b of FIG. 4 is or can be mounted in the same way as the shaft 32 of FIG. 3 so as to induce the measuring unit of the gauge 14b to respond to axial as well as to angular movements of such shaft, i.e., to enable the sensor 17b to perform the function of the sensor 16a shown in FIGS. 2 and 3. All other parts which are shown in FIG. 4 are denoted by reference characters corresponding to those shown in FIG. 1, i.e., the character 12 denotes a grinding wheel (which is movable at right angles to the axis of the workpiece 18), the character 11 denotes the base or bed of the grinding machine, and so forth.

FIGS. 5A and 5B illustrate a portion of an apparatus which embodies a third form of the invention. The two sensors are denoted by the characters 16c and 17c, and these sensors form part of a diameter measuring gauge which can be similar to the gauge 14, 14a or 14b. The sensor 17c is reciprocable in directions which are indicated by the double-headed arrow Y and is used only for measurement of the diameter of the workpiece 18 when the latter is properly mounted in the machine so that its axis coincides with the predetermined axis, namely with an axis which is defined by two centers or the like. The sensor 16c performs the functions of the sensor 16a but in a somewhat different way. The upper section 27 of the sensor 16c cooperates with the measuring unit of the gauge 14, 14a or 14b (e.g., with the measuring unit of the gauge 14 of FIG. 1) and with the sensor 17c to ascertain the diameter of the workpiece 18. The lower end portion of the section 27 is bifurcated to receive the upper end portion of the substantially L-shaped lower section of the sensor 16c so that the lower section is pivotable about the axis 46 of a shaft 42 which is normal to the axis of the workpiece 18 and of the grinding wheel (not shown in FIGS. 5A and 5B) and extends into or is otherwise associated with an angle measuring unit 41. The lower section of the sensor 16c can be pivoted about the axis 46 by the shoulder 21 of the workpiece 18 if the position of the axis 26 of the workpiece deviates from the desired position whereby the lower section of the sensor 16c changes the angular position of the shaft 42, and such change in the angular position of the shaft 42 about the axis 46 is detected by the unit 41. The upper section 27 of the sensor 16c is also movable in the directions indicated by the double-headed arrow Y, the same as in the machine tool of FIG. 1.

It is clear that the apparatus of FIGS. 5A and 5B also comprises a centering device which can maintain the lower section of the sensor 16c in a neutral angular position with reference to the axis 46 while the sensor 16c cooperates with the sensor 17c and with the measuring unit to ascertain the diameter of the workpiece 18. Furthermore, the shaft 42 need not be directly and/or rigidly connected with the measuring unit 41, i.e., it is possible to install a transmission, a linkage or other motion transmitting means between these parts so that the transmission of motion to the unit 41 takes place without play. The housing of the unit 41 can be rigidly connected with the upper section 27 of the sensor 16c but this unit need not share any other movements of the lower section of the sensor 16c.

The apparatus of FIGS. 5A and 5B can be modified by assembling the sensor 17c of two sections and by employing a sensor which replaces the sensor 16c and performs the function of the sensor 16, 17a or 16b.

It is further possible to combine the features which are shown in FIGS. 2-3 or 4 on the one hand and in FIGS. 5A-5B on the other hand, i.e., to employ the unit 41 in the grinding machine of FIGS. 2-3 or FIG. 4. This is desirable and advantageous in many instances because the accuracy of indications by the unit 41 need not be high since the unit 41 then merely serves as a means for indicating whether the apparatus is used for the measurement of the diameter or of the axial position of the workpiece. The axial position is actually monitored by the sensor 16a or 16c which is pivotable in the directions of the arrow 23 shown in FIG. 3. The signal which is then generated by the unit 41 (it being assumed that the unit 41 is used jointly with the unit 30) serves exclusively to indicate that the signal which is generated by the unit 30 denotes the axial position rather than the diameter of the workpiece. Such construction of the improved apparatus is particularly desirable when the unit 30 is to indicate the diameter and the axial position of the workpiece with a high or very high degree of accuracy.

Figure 6:
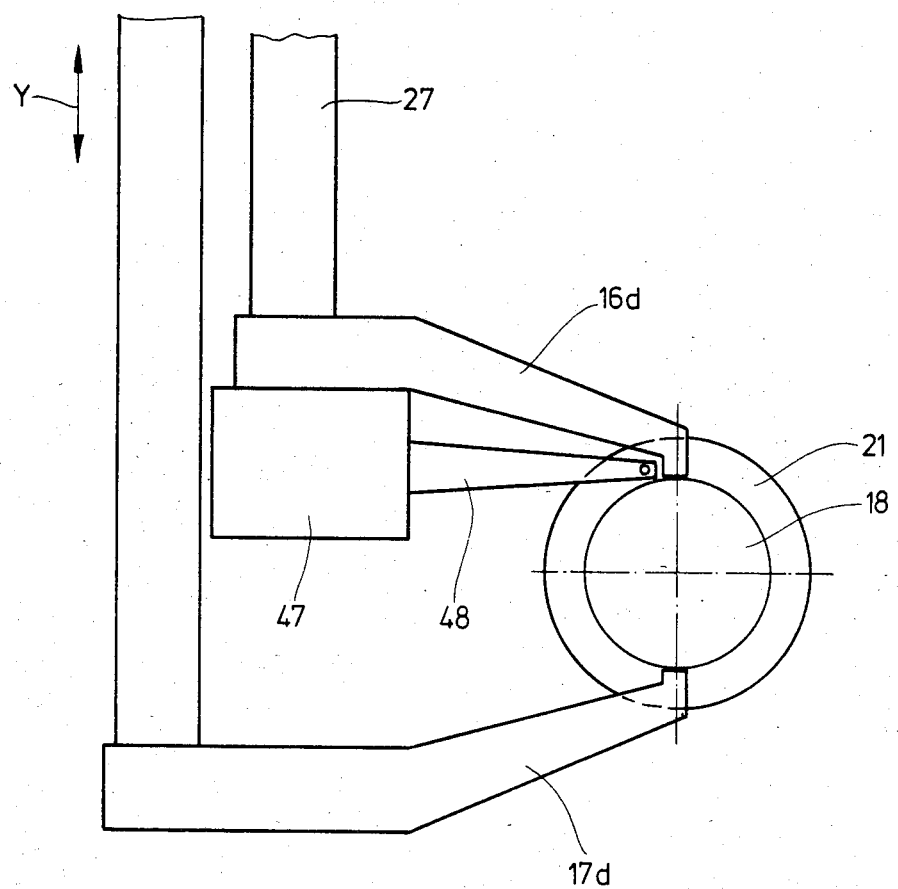
FIG. 6 is a fragmentary side elevational view of a fourth apparatus wherein the sensor which is used in connection with the monitoring of the axial position of a workpiece does not participate in determination of the diameter of such workpiece.

FIG. 6 shows a portion of a further apparatus which can be used in lieu of the apparatus of FIGS. 2–3, FIG. 4 or FIGS. 5A–5B. The diameter of the workpiece 18 is ascertained by the (first) sensors 16d and 17d, for example, in a manner as described in connection with FIG. 1. The apparatus further comprises a (second) sensor 48 which can be pivoted by the shoulder 21 of the workpiece 18 and cooperates with a measuring unit 47 (corresponding, for example, to the unit 41 of FIG. 5B) to indicate the axial position of the workpiece 18. The unit 47 and the sensor 48 are mounted on the section 27 of the sensor 16d. The unit 41 or 47 may be of any commercially available design. The same holds true for the unit 30. It will be seen that, in contrast to the apparatus of FIGS. 2–3, 4 and 5A–5B, the apparatus of FIG. 6 employs two first sensors 16d, 17d which cooperate with a first measuring unit (such as the unit 30 of FIG. 3) to ascertain the diameter of the workpiece 18, and a single second sensor 48 which is provided in addition to the sensors 16d, 17d and serves to actuate the unit for measuring or monitoring the axial position of the workpiece.

In principle, the mode of operation of all of the four improved apparatus is the same. As shown by way of example and very schematically in FIG. 2, the gauge 14a can be connected with the numerical controls NC of the grinding machine and such controls cause the sensor (16a in FIGS. 2 and 3) which is designated to cooperate with the measuring unit 30 to ascertain the axial position of the workpiece 18 to move in one of the directions which are indicated by the arrow Y so as to assume an optimum position with reference to the shoulder 21 or 21a of the workpiece which is properly installed in the machine so that its axis coincides with the aforediscussed predetermined axis. For example, the position of the sensor 16a in FIGS. 2 and 3 can be selected in such a way that the one or the other side of the free end portion of the sensor engages or is moved close to the median portion of the shoulder 21a, i.e., somewhere between the periphery of the major portion of the workpiece 18 and the peripheral surface of the shoulder 21a. The spring 43 urges the sensor 16a to its neutral angular position (if the sensor 16a is not contacted by the shoulder 21a or if the workpiece 18 of FIG. 2 is not located in an optimum axial position), or the spring 43 yields and enables the sensor 16a to move in one of the directions which are indicated by the arrow 23 if the axial position of the workpiece 18 does not coincide with the desired or optimum position. In the latter event, the workpiece 18 is moved axially until the sensor 16a reassumes its neutral angular position which indicates that the workpiece has assumed its optimum axial position. The sensor 16a can be caused to engage the shoulder 21a in response to shifting of the slide 3 and/or 13. The positions of the slides 3 and 13 are known or are monitored so that, when the sensor 16a is caused to engage the shoulder 21a, the apparatus of FIGS. 2 and 3 can generate a signal which indicates the exact or actual axial position of the workpiece 18. If such axial position is not the optimum axial position, the slide 13 is shifted until the workpiece 18 assumes the optimum axial position and is ready to be treated by the grinding wheel. The adjustment of the slide for the workpiece is terminated when a comparison of the signal denoting the actual axial position of the workpiece matches the signal denoting the optimum or desired axial position of the workpiece. Such comparison of actual-value and optimum-value signals in numerical controls of a grinding machine or another machine tool is well known and need not be described and/or shown here. It is also possible to shift the carriage or slide 3 relative to the workpiece 18 until the sensor 16a assumes its neutral angular position. The thus obtained position of the sensor 16a is detected by the controls NC and the resulting signal is used to change the axial position of the workpiece 18 until it assumes the optimum axial position.

When the axial adjustment of the workpiece 18 is completed, the sensors 16a and 17a cooperate with the unit 30 of the gauge 14a to determine the diameter of the workpiece and to thus enable the controls to regulate the extent of movement of the grinding wheel at right angles to the axis of the workpiece.

The mode of operation of the apparatus of FIG. 4 is evidently analogous to that of the apparatus of FIGS. 2 and 3 with the sole exception that the sensor 17b performs the multiple functions of the sensor 16a. The mode of operation of the apparatus of FIGS. 5A and 5B deviates from the mode of operation of the apparatus of FIGS. 2–3 primarily in that the unit 41 is used to indicate the axial position of the workpiece 18, e.g., to transmit corresponding signals to the automatic controls of the machine tool. The mode of operation of the apparatus of FIG. 6 is analogous to that of the apparatus which is shown in FIGS. 5A and 5B with the exception that the sensor 16d or 17d need not cooperate with the unit 47.

It is further clear that the improved apparatus can be used with equal or similar advantage in machine tools wherein the movements of the sensors which form part of the diameter monitoring gauge need not be programmed by numerical controls or the like, i.e., wherein the sensors which are used for measurement of the diameter can be simply moved to predetermined positions which are indicative of the desired diameter of the workpiece. Such simplified mode of operation is especially advantageous when the machine tool is used to treat long series of identical workpieces.

The unit 30 may constitute a device called "Induktiver Messtaster" of the type 1304 K produced by the firm Feinprüf GmbH, D-3400 Göttingen, German Federal Republic, and the unit 47 may constitute a device also called "Induktiver Messtaster" but of the type 1320/1 produced by Feinprüf GmbH. The unit 41 may be a cnventional rotational potentiometer or an incremental encoder, e.g., of the type produced by Siemens AG, D-8000 München, German Federal Republic.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. Apparatus for ascertaining the diameters and axial positions of round workpieces which are treated in a machine wherein the axis of the workpiece which is being treated coincides with a predetermined axis, comprising a diameter measuring assembly including a first sensor movable at right angles to said predetermined axis into engagement with the workpiece so that the position of said first sensor with reference to said predetermined axis is indicative of the diameter of the workpiece; at least one second sensor movable by a workpiece which is being treated with reference to a given axis which is normal to said predetermined axis so that its position with reference to said given axis is indicative of the axial position of the workpiece, said second sensor being disposed substantially diametrically opposite said first sensor with reference to said predetermined axis and being movable into engagement with the workpiece at right angles to said predetermined axis so that its position is indicative of the diameter of the workpiece; and measuring means for monitoring the positions of said first and second sensors with reference to said predetermined axis and said given axis, respectively.

2. The apparatus of claim 1, wherein said measuring means includes means for determining the extent of angular movement of said second sensor with reference to said given axis.

3. The apparatus of claim 1, wherein said second sensor is reciprocable into and from engagement with the workpiece, said given axis being normal to the direction of second movement of said reciprocable sensor and said measuring means including a unit which is arranged to monitor the extent of angular movement of said second sensor about said given axis.

4. The apparatus of claim 1, further comprising a holder which is stationary with reference to said measuring means, a shaft which defines said given axis, which is rotatable and axially movable with reference to said holder and which carries said second sensor, a motion transmitting member on said shaft, and moving means provided on said holder and cooperating with said member to move said shaft and said member axially of said shaft in response to angular displacement of said second sensor about said given axis, said measuring means being responsive to the axial movement of said member to generate signals when the second sensor is moved axially of said shaft at right angles to the predetermined axis to ascertain the diameter of a workpiece as well as when said second sensor is moved angularly and such angular movement entails an axial movement of said shaft.

5. The apparatus of claim 1, wherein said diameter measuring assembly includes two first sensors and said measuring means includes a first unit arranged to generate signals in response to movement of said first sensors at right angles to said predetermined axis and a second unit arranged to generate signals in response to angular movement of said second sensor about said given axis.

6. The apparatus of claim 5, wherein said second sensor and said second unit are mounted on one of said first sensors.

7. The apparatus of claim 1, wherein said measuring means comprises a single measuring unit.

8. The apparatus of claim 1, wherein said measuring means comprises a first unit arranged to generate signals denoting the position of said first sensor relative to said predetermined axis and a second unit arranged to generate signals denoting the position of said second sensor with reference to said given axis.

9. The apparatus of claim 1, further comprising a carriage for moving said sensors and said measuring means in substantial parallelism with said predetermined axis.

10. The apparatus of claim 1, wherein said measuring means is disposed at a level above said predetermined axis.

11. The apparatus of claim 1, wherein said second sensor includes a first section which is operatively connected with said measuring means and a second section which is pivotable with reference to said first section about said given axis.

12. The apparatus of claim 1, wherein said sensors include work contacting portions and the work contacting portion of one of said sensors is nearer to said measuring means than the work contacting portion of the other of said sensors.

13. Apparatus for ascertaining the diameters and axial positions of round workpieces which are treated in a machine wherein the axis of the workpiece which is being treated coincides with a predetermined axis, comprising a diameter measuring assembly including at least one first sensor movable at right angles to said predetermined axis into engagement with the workpiece so that the position of said first sensor with reference to said predetermined axis is indicative of the diameter of the workpiece; at least one second sensor movable by a workpiece which is being treated with reference to a given axis which is normal to said predetermined axis so that its position with reference to said given axis is indicative of the axis position of the workpiece; measuring means for monitoring the positions of said first and second sensors with reference to said predetermined axis and said given axis, respectively; a holder which is stationary with reference to said measuring means; a shaft which defines said given axis, which is rotatable and axially movable with reference to said holder and which carries said second sensor; a motion transmitting member on said shaft; and moving means provided on said holder and cooperating with said member to move said shaft and said member axially of said shaft in response to angular displacement of said second sensor about said given axis, said measuring means being responsive to the axial movement of said member to generate signals when the second sensor is moved axially of said shaft at right angles to the predetermined axis to ascertain the diameter of the workpiece as well as when said second sensor is moved angularly and such angular movement entails an axial movement of said shaft.

14. The apparatus of claim 13, further comprising displacing means interposed between said member and said measuring means.

15. The apparatus of claim 13, wherein said member includes a first portion cooperating with said moving means and a second portion, and further comprising centering means for yieldably urging said second sensor to a predetermined angular position by way of said second portion.

16. The apparatus of claim 15, wherein said member includes a yoke having first and second arms constituting said first and second portions, respectively.

17. The apparatus of claim 15, wherein said centering means includes a rotary element mounted on said holder and having two protuberances flanking said second portion, and means for biasing said protuberances against said second portion.

* * * * *